United States Patent
Chan et al.

(10) Patent No.: US 8,904,160 B2
(45) Date of Patent: Dec. 2, 2014

(54) ELECTRONIC DEVICE WHICH AUTOMATICALLY SETS UP MULTIPLE OPERATING SYSTEMS FOR A TEST SYSTEM BY GENERATING AN EMPTIED BOOT RECORD STATUS AND LOADING A TARGET OPERATING SYSTEM ACCORDING TO THE EMPTIED BOOT RECORD STATUS

(75) Inventors: Chun-Chieh Chan, Taipei Hsien (TW); Kung-Hua Lu, Taipei Hsien (TW)

(73) Assignee: Wistron Corporation, Hsichih, New Taipei (TW)

( * ) Notice: Subject to any disclaimer, the term of this patent is extended or adjusted under 35 U.S.C. 154(b) by 339 days.

(21) Appl. No.: 12/885,552

(22) Filed: Sep. 19, 2010

(65) Prior Publication Data

US 2011/0107074 A1    May 5, 2011

(30) Foreign Application Priority Data

Nov. 2, 2009    (TW) ................. 98137118 A

(51) Int. Cl.
*G06F 9/00* (2006.01)
*G06F 15/177* (2006.01)
*G06F 9/44* (2006.01)

(52) U.S. Cl.
CPC .................. *G06F 9/4406* (2013.01)
USPC ................................. 713/2; 713/1

(58) Field of Classification Search
CPC .................................. G06F 9/4406
USPC ........... 712/244; 714/36, 38, 6, 15, 33, 38.14; 711/204, 108, 135, 162; 713/2, 1; 709/224, 203; 358/1; 370/412
See application file for complete search history.

(56) References Cited

U.S. PATENT DOCUMENTS

| | | | | |
|---|---|---|---|---|
| 5,809,560 A | * | 9/1998 | Schneider | 711/204 |
| 6,304,982 B1 | * | 10/2001 | Mongan et al. | 714/38.14 |
| 6,546,547 B1 | * | 4/2003 | Runyan et al. | 717/124 |
| 6,591,332 B1 | * | 7/2003 | Swanson et al. | 711/108 |
| 6,996,706 B1 | * | 2/2006 | Madden et al. | 713/2 |
| 7,426,052 B2 | * | 9/2008 | Cox et al. | 358/1.15 |
| 7,574,565 B2 | * | 8/2009 | De Souza | 711/135 |

(Continued)

FOREIGN PATENT DOCUMENTS

| | | |
|---|---|---|
| CN | 1504880 A | 6/2004 |
| CN | 101458622 A | 6/2009 |

(Continued)

OTHER PUBLICATIONS

Office action mailed on May 20, 2013 for the Taiwan application No. 098137118, filing date: Nov. 2, 2009, p. 2-6 and p. 7 line 1-22.

(Continued)

*Primary Examiner* — Thomas Lee
*Assistant Examiner* — Aurel Prifti
(74) *Attorney, Agent, or Firm* — Winston Hsu; Scott Margo

(57) ABSTRACT

To reduce human resource cost, a method of automatically, consecutively setting up multiple operating systems, for an electronic device operating in an operating system, includes clearing a partition sector of the electronic device during operation of the operating system to generate an emptied boot record status, and setting up a target operating system according to the emptied boot record status and a setup procedure associated with the target operating system when the electronic device reboots.

21 Claims, 6 Drawing Sheets

(56) References Cited

U.S. PATENT DOCUMENTS

| | | | |
|---|---|---|---|
| 7,574,624 B2 * | 8/2009 | Chen et al. | 714/36 |
| 7,765,394 B2 * | 7/2010 | Beelitz et al. | 713/2 |
| 8,037,360 B2 * | 10/2011 | Rusmanov | 714/38.1 |
| 8,219,793 B2 * | 7/2012 | Park | 713/2 |
| 8,370,617 B2 * | 2/2013 | Li | 713/2 |
| 2003/0072316 A1 * | 4/2003 | Niu et al. | 370/412 |
| 2004/0153724 A1 * | 8/2004 | Nicholson et al. | 714/6 |
| 2006/0041738 A1 * | 2/2006 | Lai | 713/2 |
| 2006/0224873 A1 * | 10/2006 | McCormick et al. | 712/244 |
| 2006/0271672 A1 * | 11/2006 | Liu et al. | 709/224 |
| 2006/0288197 A1 * | 12/2006 | Swanson et al. | 713/1 |
| 2007/0214390 A1 * | 9/2007 | Liu et al. | 714/33 |
| 2007/0239861 A1 | 10/2007 | Reeves | |
| 2007/0294332 A1 * | 12/2007 | Karki et al. | 709/203 |
| 2008/0046781 A1 * | 2/2008 | Childs et al. | 714/15 |
| 2008/0168244 A1 * | 7/2008 | Chu Chen et al. | 711/162 |
| 2009/0125709 A1 * | 5/2009 | Martinez et al. | 713/2 |

FOREIGN PATENT DOCUMENTS

| | | |
|---|---|---|
| CN | 101546270 A | 9/2009 |
| TW | 200821934 | 5/2008 |
| TW | 200821934 A | 5/2008 |
| TW | 200825717 | 6/2008 |
| TW | 200825717 A | 6/2008 |

OTHER PUBLICATIONS

Office action mailed on Jan. 15, 2013 for the Taiwan application No. 098137118, filing date: Nov. 2, 2009, p. 1 line 6-11 and line 13-14, p. 2-3, p. 4 line 1-5 and line 7-26, p. 5 and p. 6 line 1-15.

Office action mailed on Dec. 28, 2012 for the China application No. 200910210572.1, p. 3 line 5-33 and line 35-38, p. 4 line 1-21 and line 23-40, p. 5 line 1-14, line 18-23, line 25-28 and line 30-40, p. 6 line 1-2, line 4-12, line 14-17, line 19-31 and line 33-39 and p. 7 line 1-2 and line 4-16.

Office action mailed on Jul. 26, 2013 for the China application No. 200910210572.1, p. 3 line 7-44, p. 4-8, p. 9 line 1-26, search report and related non-patent literature.

Matt Welsh et al., "Running Linux (third edition)", Mar. 2000, p. 68-74 and p. 93-97, O'Reilly & Associates, Inc. and Chinese Electric Power Press.

Office action mailed on Mar. 7, 2014, for the Taiwan application No. 09137118, filing date: Nov. 2, 2009, p. 2, line 17-26, p. 3 and p. 4 line 1-5.

* cited by examiner

ELECTRONIC DEVICE WHICH AUTOMATICALLY SETS UP MULTIPLE OPERATING SYSTEMS FOR A TEST SYSTEM BY GENERATING AN EMPTIED BOOT RECORD STATUS AND LOADING A TARGET OPERATING SYSTEM ACCORDING TO THE EMPTIED BOOT RECORD STATUS

BACKGROUND OF THE INVENTION

1. Field of the Invention

The present invention relates to an electronic device and related method and system, more particularly, to an electronic device of automatically, consecutively setting up multiple operating systems and related method and system.

2. Description of the Prior Art

Hardware and software of computer products have to be tested before the products are brought to the market for product quality ensuring. Since manufacturer produces a large number of the computer products with different features, a test system with high efficiency, automation and wide application is needed.

At present, a network test system has higher efficiency and wider application, and generally includes a server and a test database. According to design of a device under test (DUT), an operator can set up test files and test environment file into the server in advance for the DUT to download, so as to perform test operation in the DUT. In addition, the test database can provide related test parameters and collect test result of the DUT.

For the DUT of the computer products, the operator has to test the DUT in different operating systems to ensure that the products can operate normally in operating systems that consumers may set up into the products. In the network test system, the DUT needs to download a setup procedure module (known as Answer File) from the server through a remote install technology, and thereby sets up an operating system under test of the server. The remote install environment is a preboot execution environment (PXE) and is usually used in the network test system. Please refer to FIG. 1, which is a flowchart of a test procedure 10 used in a DUT according to the prior art. The test procedure 10 includes the following steps:

Step 100: Turn on power.

Step 102: An operator presses a key F12 for network boot procedure entrance to load PXE network setup functions.

Step 104: Enter a PXE function menu.

Step 106: The operator selects an operating system under test.

Step 108: Download a setup procedure module associated with the operating system under test from a server.

Step 110: Set up the operating system under test according to the setup procedure module.

Step 112: Download a test module of the operating system from the server after the selected operating system under test is set up in the device under test.

Step 114: Call test parameters of a test database.

Step 116: Execute the test module for performing a test procedure according to the test parameters.

Step 118: Transmit a test result to the test database after the test procedure is performed.

Step 120: End.

Through the test procedure 10, the operator can set up an operating system under test in the device under test at one time. However, the device under test is usually required to test multiple operating systems for ensuring product quality. Therefore, in the conventional test system, for each time the test procedure 10 is completed, the device under test is required to be restarted for executing the test procedure 10 again, so as to set up and test the next operating system under test until test operations of all of the operating system under test is completed. In such manner, the operator has to stay around the device under test to monitor whether the present operating system under test is completely tested, and then manually set up the next operating system under test. This means that the device under test cannot continuously perform test operations for different operating systems under test after the operator is off duty, thereby increasing human resource cost with such test system design.

In addition, Republic of China Publication No. CN 1504880A discloses a method of automatically setting up the operating systems by using Linux, which generates a corresponding setup answer file and system setup file according to a practical hardware state of a target device for operating system automatic setup. However, this method is only used for automatically setting up a target operating system. If another target operating system is required to be automatically set up, a user still needs to manually repeat related procedures.

SUMMARY OF THE INVENTION

Therefore, the present invention provides an electronic device capable of automatically, consecutively setting up multiple operating systems and related method and system for human resource cost saving.

The present invention discloses an electronic device capable of automatically setting up multiple operating systems. The electronic device includes a system operation unit, a receiving unit, a setup procedure module, a setup guiding module and a system setup unit. The system operation unit is operated in an operating system. The receiving unit is used for receiving a target operating system. The setup procedure module is used for providing a setup procedure associated with the target operating system. The setup guiding module is used for clearing a partition sector of the electronic device during operation of the operating system to generate an emptied boot record status. The system setup unit is used for setting up the target operating system according to the emptied boot record status and the setup procedure when the electronic device reboots.

The present invention further discloses a method of automatically, consecutively setting up multiple operating systems, for an electronic device operated in an operating system. The method includes clearing a partition sector of the electronic device during operation of the operating system to generate an emptied boot record status, and setting up a target operating system according to the emptied boot record status and a setup procedure associated with the target operating system when the electronic device reboots.

The present invention further discloses a method of automatically, consecutively setting up multiple operating systems, for a test system. The method includes providing a server including a plurality of operating systems under test and a remote install environment, providing a device under test, hereinafter called DUT, coupled to the server and operated in a third operating system of the plurality of operating systems under test, wherein the DUT is compatible with the remote install environment and includes a third setup guiding module associated with the third operating system and a fourth setup procedure module associated with a fourth operating system of the plurality of operating systems under test, utilizing the third setup guiding module to clear a partition sector of the DUT, to generate an emptied boot record status, rebooting the DUT operated in the third operating system, after the DUT is rebooted, entering a network boot procedure according to the emptied boot record status for loading the remote install environment, setting up the fourth operating system from the server into the DUT according to the fourth setup procedure module under the remote install environment, and performing a fourth test procedure associated with the fourth operating system after the fourth operating system is completely set up into the DUT.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
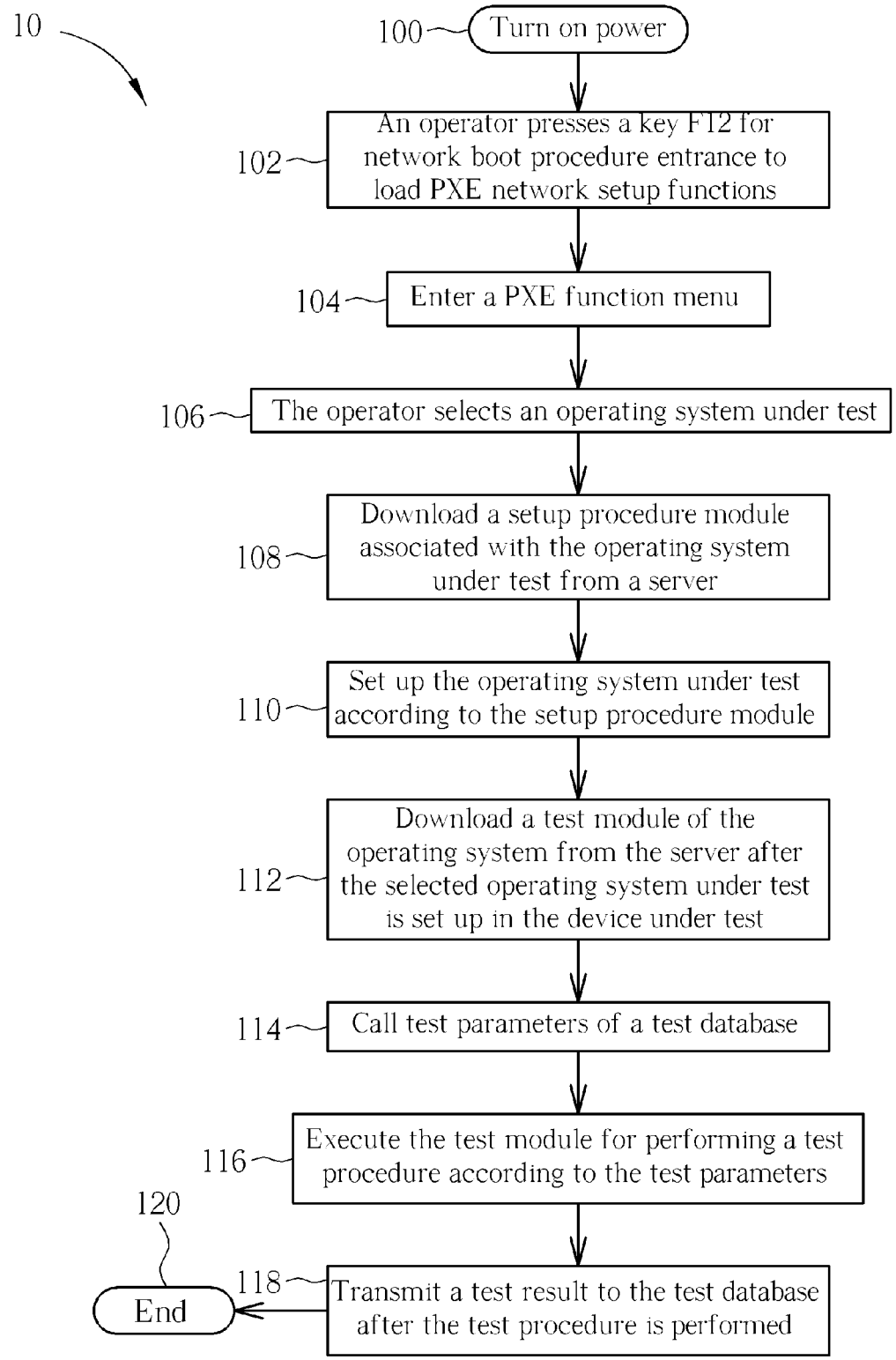
FIG. 1 is a flowchart diagram of a test procedure according to the prior art.
Figure 2:
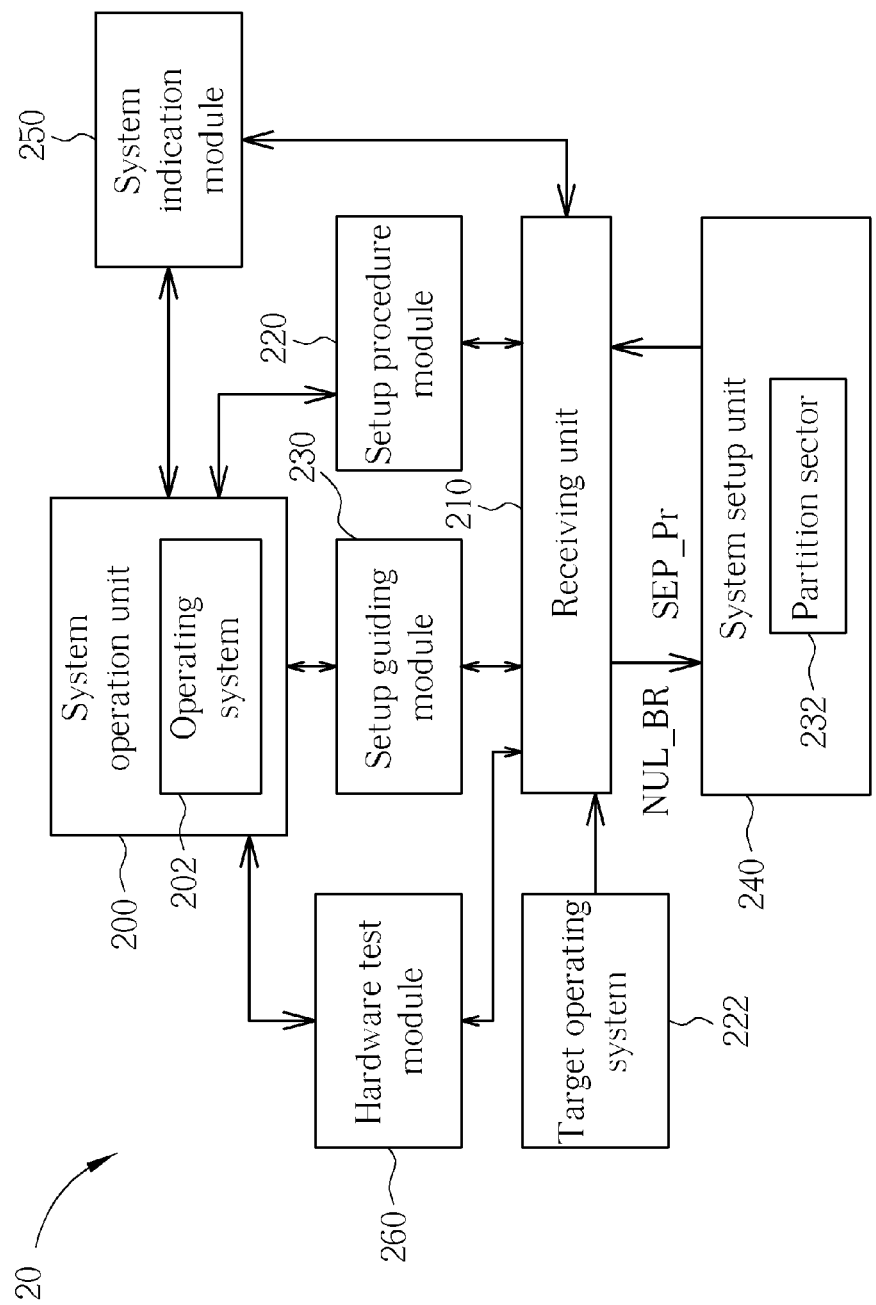
FIG. 2 is a schematic diagram of an electronic device capable of automatically setting up operating systems according to an embodiment of the present invention.

Please refer to FIG. 2, which is a schematic diagram of an electronic device 20 capable of automatically setting up operating systems according to an embodiment of the present invention. The electronic device 20 can perform hard disk booting and non-hard disk booting (e.g. network or compact disk booting), where the hard disk booting is arranged prior to the nor-hard disk booting. For example, a boot sequence is floppy disk→drive hard disk drive→CD-ROM drive→network. In addition, the electronic device 20 includes a system operation unit 200, a receiving unit 210, a setup procedure module (known as Answer File) 220, a setup guiding module 230, a system setup unit 240, a system indication module 250 and a hardware test module 260.

Through the system operation unit 200, the electronic device 20 can be operated in a completed setup operating system 202. During the operation of the operating system 202, the hardware test module 260 starts to a test for hardware devices of the electronic device 20, such as basic input/output system (BIOS), hard disk driving, network card driving, power, etc. After the operation of the abovementioned test is finished, the setup guiding module 230 clears a partition sector 232 of the electronic device 20, to generate an emptied boot record status NUL_BR. In an exemplary embodiment of the present invention, the partition sector 232 is a master boot record (MBR). Hard disk of the electronic device 20 can be integrated device electronics (IDE), a small computer system interface (SCSI), SAS (Serial Attached SCSI), SSD (Solid State Drive), or SATA (Serial AT Attachment) hard disk in 2.5 inch or 3.5 inch, or a redundant array of independent disk (RAID) card, such as RAID0, RAID1, and RAID6. Therefore, the electronic device 20 uses the setup guiding module 230 to clear boot partition loader or/and partition data of the hard disk. After the emptied boot record status NUL_BR is generated, the system indication module 250 is generated by the system setup unit 240 thereof, so as to indicate the next operating system desired to be set up into the system operation unit 200. The setup procedure module 220 is used for providing a setup procedure SEP_Pr associated with a target operating system 222. After the electronic device 20 reboots, the system setup unit 240 sets up the target operating system 222 according to the emptied boot record status NUL_BR and the setup procedure SEP_Pr, wherein the target operating system 222 is obtained via the receiving unit 210. After that, the system operation unit 200 is operated in the newly setup target operating system 222. In other words, since the boot record of the hard disk has been cleared, the electronic device 20 cannot perform the hard disk booting after rebooting, and instead, performs the non-hard disk booting, thereby utilizing the setup procedure module 220 to set up a new operating system.

Therefore, setup guiding modules and setup procedure modules corresponding to different operating systems can be set up into the electronic device 20. Hence, the electronic device 20 can set up an operating system according to corresponding setup procedure module, and clear partition sector during the operation of the operating system, so as to automatically set up another operating system according to emptied boot record status after the electronic device 20 reboots. As a result, the electronic device 20 can reach the goal of automatically, consecutively setting up multiple operating systems.

In addition, the setup procedure module 220, the setup guiding module 230, and the hardware test module 260 of the electronic device 20 can be obtained through the receiving unit 210. For example, if the non-hard disk booting performed in the electronic device 20 is a CD booting, the receiving unit 210 is a data transmission interface, such as IDE (Integrated Drive Electronics) or SCSI (Small Computer System Interface) for receiving the target operating system 222, the hardware test module 260, the setup procedure module 220 and the setup guiding module 230 from a CD storage device. Or, if the receiving unit 210 is a network unit, the receiving unit 210 is then connected to a server via network booting and obtains the target operating system 222, setup procedure module 220 and setup guiding module 230 through network file-sharing or transfer protocol. Under the network automatic remote installation, the system operation unit 200 can generate the system indication module 250, and then transmit the system indication module 250 to the server via the receiving unit 210, so as to indicate the next operating system desired to be set up.

Figure 3:
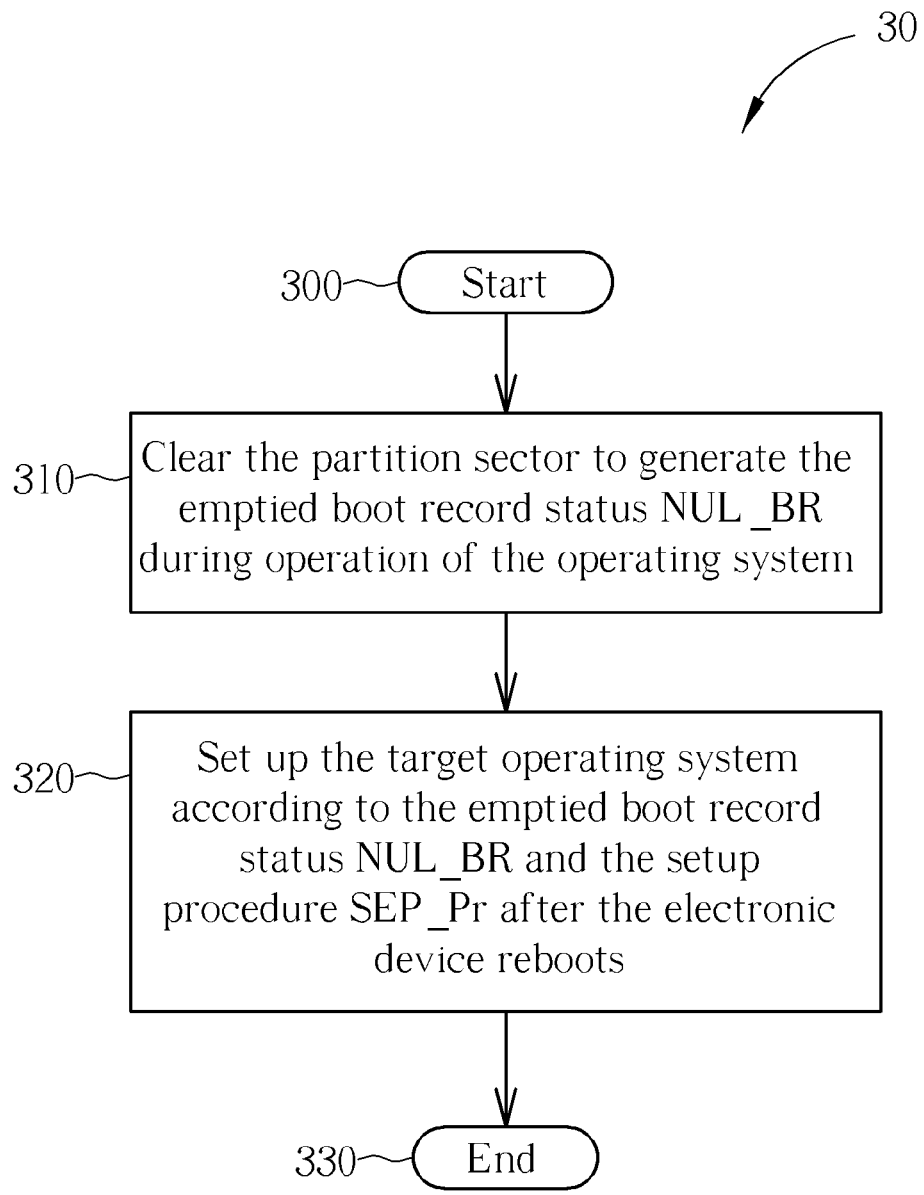
FIG. 3 is a flowchart diagram of a process according to an embodiment of the present invention.

Please refer to FIG. 3, which is a flowchart of a process 30 according to an embodiment of the present invention. The process 30 is used for realizing operation of the electronic device 20, and includes the following steps:

Step 300: Start.

Step 310: Clear the partition sector 232 to generate the emptied boot record status NUL_BR during operation of the operating system 202.

Step 320: Set up the target operating system 222 according to the emptied boot record status NUL_BR and the setup procedure SEP_Pr after the electronic device 20 reboots.

Step 330: End.

The process 30 illustrates steps of automatically setting up from one operating system to another operating system for the electronic device 20. When the electronic device 20 is set up completely and operated in the target operating system, the electronic device 20 automatically executes step 310 again, namely clearing the partition sector for setting up another target operating system. In other words, the electronic device 20 can automatically, consecutively set up multiple operating systems through automatically, repeatedly executing the process 30. Since the process 30 is used for realizing operation of the electronic device 20, detailed principle can be referred from the abovementioned description.

In addition, the concept of the present invention can be applied in an industry test system. That is, a computer device under test can automatically, consecutively perform test operations under different operating systems without manually setup operating system one by one via an operator. Please refer to FIG. 4, which is a schematic diagram of a test system 40 according to an embodiment of the present invention. The test system 40 includes a server 400, a device under test (hereafter called DUT) 410, a test database 420, and a monitor 430, which are connected via a local area network or a wide area network. The server 400 provides a plurality of operating systems under test for the DUT 410, and thereby the DUT 410 can automatically set up the operating systems through the network, and perform related test processes after each of the operating systems is completely set up. The test database 420 is used for providing items and parameters of the test processes, and collecting test results from the DUT 410. The operator can utilize the monitor 430 to modify test items and parameters. Detailed principle and requirement of the test method can be referred to description of "Server Configuration", "DUT Configuration", and "Setup and Test Procedure".

[Server Configuration]:

The server 400 includes a preboot execution environment (PXE) 402, operating systems under test OS(1)-OS(n), test modules TES(1)-TES(n), setup procedure modules (Answer Files) AsF(1)-AsF(n), and setup guiding modules CMF(1)-CMF(n). The server 400 can be operated in Microsoft operating system or Linux operating system and utilizes PXE environment to remote control the DUT 410, so the DUT 410 can automatically, consecutively set up operating systems under test OS(1)-OS(n) and perform related software and hardware tests. Operating systems under test OS(1)-OS(n) can be stored in the server 400 in a format of image file, and can be operating systems, such as DOS (Disk Operating System), Linux and Microsoft (MS), etc.

For realizing PXE environment, the server 400 at least includes a network activation module 404, a file-sharing and transmission module 406, and a preboot execution setup file 408. The network activation module 404 is used for configuring a network address to the DUT 410. The file-sharing and transmission module 406 is used for establishing a network file-sharing and transmitting link with the DUT 410 for transmitting and sharing the operating systems OS(1)-OS(n), and related test and system setup modules. The preboot execution setup file 408 is used for providing a boot menu to the DUT 410 when the DUT loads PXE environment.

For example, under the PXE of Linux operating system, the server 400 includes a dynamic host configuration protocol (DHCP) server module, a network file system (NFS) server module, a trivial file transfer protocol (TFTP) server module and a preboot execution setup file: pxelinux.cfg/default. The DHCP server module is used for providing a dynamic network address to the DUT 410, so the DUT 410 becomes a network node of the test system 40. The NFS server module provides file-sharing service. The TFTP server module is used for providing a file transmission connection established on a user datagram protocol (UDP). The preboot execution setup file pxelinux.cfg/default is a default file established under directory of pxelinux.cfg. Take an example as following (# indicating annotation):

default rh5u3x32 #Default operating system is rh5u3x32 as below
timeout 60 #If an user does not select the operating system within 60 seconds, the default operating system is used
prompt 1
display display.msg #boot display message for displaying selections of operating system under test
F1 test.msg #A display message by pressing F1
F2 test2.msg #A display message by pressing F2
label localboot #Use hard disk direct booting by the hard disk of the DUT 410
LOCALBOOT 0
label rh5u3x32 #Operating system under test, Red Hat 5 Update 3, and required setup procedure module and network card of Kickstart type
kernel rh5u3x32/rh5u3x32
    append initrd=rh5u3x32/rh5u3x32.img ramdisk_size=256000
    method=nfs:192.168.100.1:/opt/iso/rh5u3x32 ip=dhcp vga=80x25
label sles10sp1x32 #Operating system under test, SUSE Enterprise Linux 10 SP2x32, and required setup procedure module of AutoYast type
kernel sles10sp1x32/sles10sp1x32
    append initrd=sles10sp1x32/sles10sp1x32.img ramdisk_size=256000 insmode=nfs netconfig=dhcp install=nfs://192.168.100.1/opt/iso/sles10sp1x32 vga=0x314
    splash=verbose
label win # Operating system under test Windows and related kernel and setup
kernel pxeboot.0

Under the PXE of Microsoft operating system, besides the DHCP, NFS, TFTP server module and PXE setup file, whose setup content can be referred to abovementioned preboot execution setup file pxelinux.cfg/default, the server 400 at least includes the following conditions for realizing the automatic setup function:

1. Include Windows Deployment Service (WDS) and Remote Install Service (RIS) server function simultaneously, or other equivalent Microsoft suite;
2. Add instruction <META ACTION=AUTOENTER> into <TITLE> instruction partition of welcome.osg, welcome.osg, warning.osg, oschoice.osg, install.osg and login.osg setup file in remote install service, and add instruction<INPUT NAME="USERNAME" MAXLENGTH=255 TYPE=TEXT VALUE=administrator> and <INPUT NAME="*PASSWORD" TYPE=PASSWORD MAXLENGTH=20><BR> into login.osg, to skip manual input management account number, password and setup operating system stand procedure;
3. Change file name pxeboot.n12 in Microsoft operating system i386 into pxeboot.0 for skipping a manual step requiring the user to press a F12 key to boot PXE.

In addition, in the server 400, each operating system under test corresponds to a test module, a setup procedure module and a setup guiding module. The test modules TES(1)-TES(n) are used for providing a test procedure of the operating systems OS(1)-OS(n) for the DUT 410 respectively, and the test items can include repeated boot test, pressure test, basic input/output system, hard disk driving program, network card driving program, power, baseboard management controller (BMC), temperature measurement, Wake On LAN (WOL), etc. The setup procedure modules AsF(1)-AsF(n) are used for providing a setup procedure of the operating systems OS(1)-OS(n) to the DUT 410 respectively. The setup procedure module is well known in the art. For example, in Linux environment, Kickstart or AutoYast can be used for allocating files, and in Microsoft environment, a file ristndrd.sif under directory of i386 \templates can be used for realizing the setup procedure module. Exemplary program below is used for loading test module in the setup procedure module (# indicating annotation):

EXAMPLE 1

Operating System Under Test Red Hat/Kickstart Syntax

% post #Guide the DUT 410 to execute the following programs after the operating system under test is completely set up
cd /test
mount -o nolock 192.168.100.1:/opt/iso/tools/Lucas/rh5u3x32/test #Load a remote test directory file folder into a directory file folder of the DUT 410 for copying a program code needed to be test, which includes test items, such as a pressure test.
sleep 10
cd/test
cp -rf* / #Copy remote directory test program code to the DUT 410
cd /auto
sleep 10
sh /auto/auto.sh<pxe.txt #Execute a test module whose file name is pxe.txt
umount /test #Remove the directory file folder of the DUT 410

EXAMPLE 2

Operating System Under Test SUSE Linux/XML (Extensible Markup Language) Syntax

```
- <scripts>
- <init-scripts config:type="list">      # Guide the DUT 410 to execute
                        the following programs after the operating
                        system under test is completely set up
- <script>
  <debug config:type="boolean">true</debug>
  <filename>auto</filename>
  <location />
- <source>
- <![CDATA[
ifconfig eth0 192.168.100.223
mkdir /test
chmod 777 /test
mount -o nolock 192.168.100.1:/opt/iso/tools/Lucas/sles10sp2x32
                        /test    # Load a remote test directory file folder
                        into a directory file folder of the DUT 410
sleep 10
cd /test
cp -rf * /
cd /auto
sleep 10
sh /auto/auto.sh < pxe.txt    # Execute a test module whose file name is
                        pxe.txt
umount /test
sleep 2
]]>
  </source>
  </script>
  </init-scripts>
  </scripts>
```

The setup guiding modules CMF(1)-CMF(n) are used for clearing a master boot record (MBR) for the DUT 410 under the operating systems under test OS(1)-OS(n) respectively. Some examples associated to the setup guiding module are provided as follows (# indicating annotation):

EXAMPLE 1

Instructions Below are Used for Clearing the MBR in Related Linux Operating System Under Test dd if=/dev/zero of=/dev/sda bs=512 count=1

EXAMPLE 2

Operating System Under Test Windows

Run ("cmd.exe")
send ("mbrwiz /Part=0 /Del /Confirm") #Call an application program mbrwiz for clear the MBR
send ("{Enter}") #Transmit an input confirmation command
[DUT Configuration]:
The DUT 410 includes a network unit 412, a system operation unit 414, and a system setup unit 416. When the DUT 410 boots and uses the PXE network setup function, the network unit 412 sets a network address in itself according to a network address configured by the server 400, so as to enter the network of the test system 40. In addition, the network unit 412 is used for establishing file-sharing and transmitting link with the server 400, so as to obtain and use the preboot execution setup file, the operating systems under test OS(1)-OS(n), the test modules TES(1)-TES(n), the setup procedure modules AsF(1)-AsF(n), the setup guiding modules CMF(1)-CMF (n), and the test data provided by the test database 420. The system operation unit 414 is used in an operating system under test that has been set up, and is used for executing the test procedure according to the received test module and test data. After the test procedure is completely performed, the system operation unit 414 reports the test result to the test database 420 through the network unit 412. In addition, the system operation unit 414 can execute the setup guiding modules CMF(1)-CMF (n) for clearing the partition sector during operation of the operating systems under test OS(1)-OS(n), to generate the emptied boot record status. Under environment of the operating systems under test OS(1)-OS (n), the system operation unit 414 generates and reads the system indication modules SYSIM(1)-SYSIM(n) for indicating the next operating system under test to the system setup unit 416 and the server 400. The system setup unit 416 includes BIOS of the DUT 410, and since the hard disk booting cannot be performed due to the emptied boot record status, the DUT 410 is switched to perform network booting after rebooting. After that, the system setup unit 416 receives the setup procedure modules AsF(1)-AsF(n) according to the system indication modules SYSIM(1)-SYSIM (n), for downloading and setting up the operating systems under test OS(1)-OS(n).

Figure 5A:
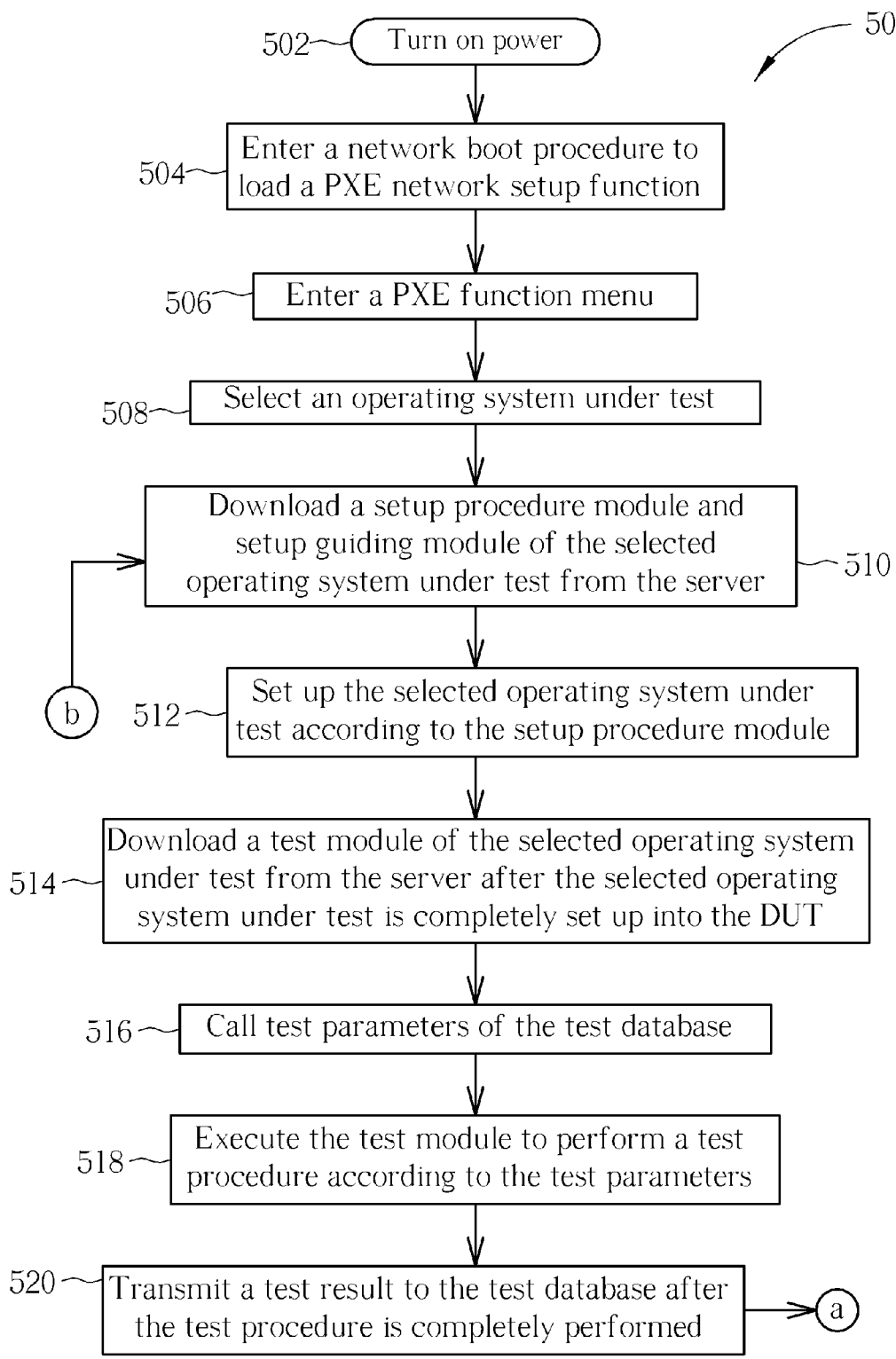
FIG. 5A-5B are flowchart diagrams of a test procedure according to embodiments of the present invention.
Figure 5B:
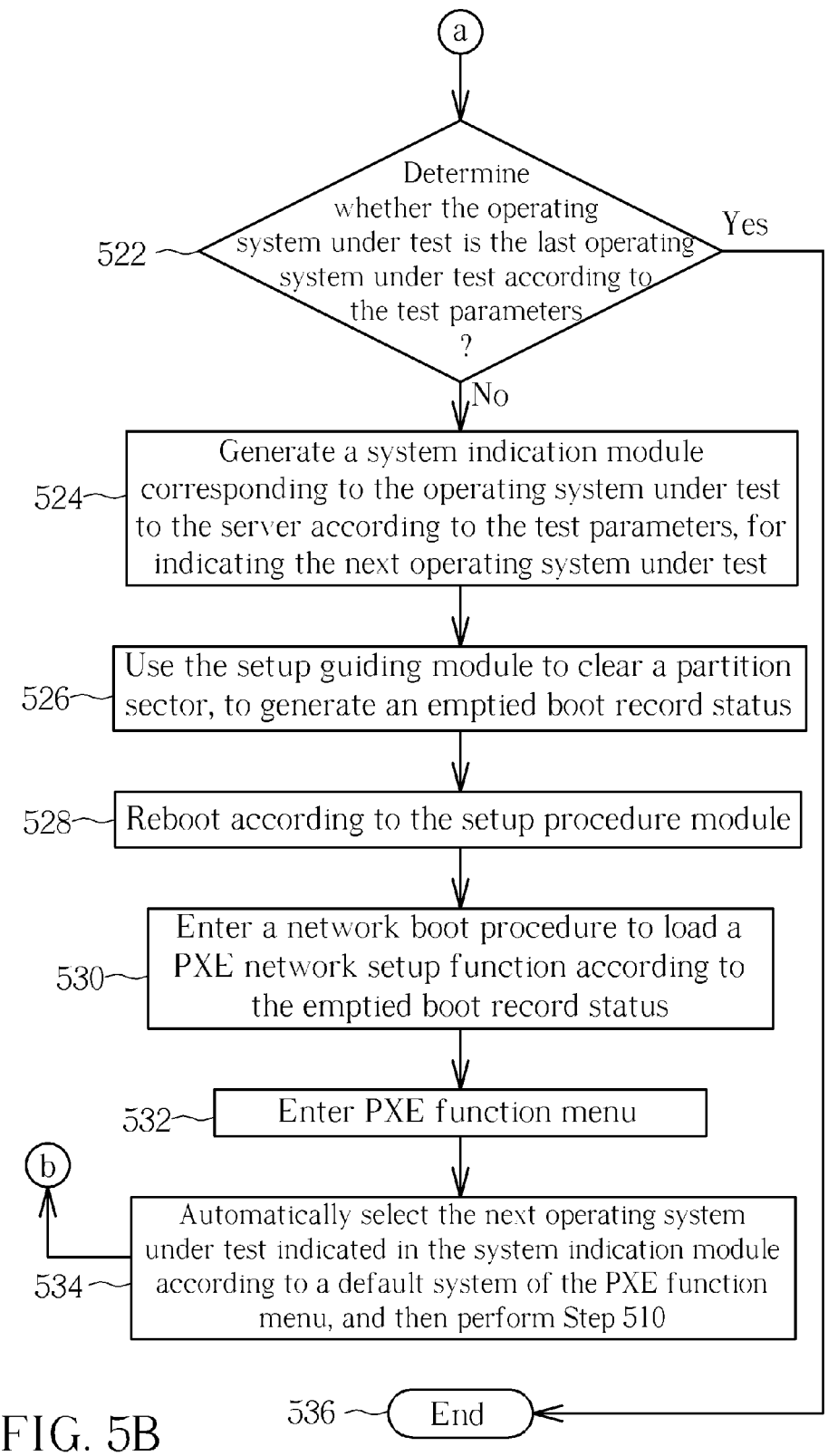

[Setup and Test Procedure]:
Please refer to FIG. 5A-5B, which are flowchart diagrams of a test process 50 used in the DUT 410. In the test process 50, the boot sequence of the DUT 410 is assumed that the hard disk booting is arranged prior to a non-hard disk booting. Through the test process 50, the DUT 410 can automatically, consecutively set up and test operating systems under test. The test process 50 includes the following steps:

Step 502: Turn on power.

Step 504: Enter a network boot procedure to load a PXE network setup function.

Step 506: Enter a PXE function menu.

Step 508: Select an operating system under test (the operating system OS(1) is selected if the first operating system under test needed to be set up is the operating system OS(1)).

Step 510: Download a setup procedure module and setup guiding module of the selected operating system under test from the server 400.

Step 512: Set up the selected operating system under test according to the setup procedure module.

Step 514: Download a test module of the selected operating system under test from the server 400 after the selected operating system under test is completely set up into the DUT 410.

Step 516: Call test parameters of the test database 420.

Step 518: Execute the test module to perform a test procedure according to the test parameters.

Step 520: Transmit a test result to the test database 420 after the test procedure is completely performed.

Step 522: Determine whether the operating system under test is the last operating system under test according to the test parameters. If yes, perform Step 536; otherwise perform Step 524.

Step 524: Generate a system indication module corresponding to the operating system under test to the server 400 according to the test parameters, for indicating the next operating system under test.

Step 526: Use the setup guiding module to clear a partition sector, to generate an emptied boot record status.

Step 528: Reboot according to the setup procedure module.

Step 530: Enter a network boot procedure to load a PXE network setup function according to the emptied boot record status.

Step 532: Enter PXE function menu.

Step 534: Automatically select the next operating system under test indicated in the system indication module according to a default system of the PXE function menu, and then perform Step 510.

Step 536: End.

Steps 504-508 are used for loading the PXE network setup function and setting up the first operating system under test OS(1). In Steps 530-534, the DUT 410 automatically loads the PXE network setup function and selects the operating system under test. In addition, in Steps 504-506 and Steps 530-532, the DUT 410 loads the PXE network setup function according to the network address assigned by the server 400 through a network file-sharing and transmitting link establishment, and display the PXE menu according to content of the preboot execution setup file pxelinux.cfg/default. Moreover, in Steps 532-534, the DUT 410 selects the predetermined operating system under test after waiting a timeout set by the preboot execution setup file pxelinux.cfg/default.

In Steps 522-524, the DUT 410 knows whether there is a next operating system under test needed to be set up and operating system name thereof according to the test parameters. On the other hand, the server 400 continues monitoring the system indication module in the DUT 410. For example, if the DUT 410 is operated in the operating system under test OS(1), the server 400 monitors the system indication module SYSIM(1), whereas if the DUT 410 is operated in the operating system under test OS(2), the server 400 monitors the system indication module SYSIM(2), and so on. When content of operating system under test in the generated system indication module changes, the server 400 modifies the predetermined system of 'default' item in /tftpboot/pxelinux.cfg/default accordingly, and reboots the tftp service. Therefore, the DUT 410 can select the operating system indicated by the preceding system indication module when Steps 530-534 is performed. Take an example of the system indication module as follows (# # indicating annotation):

The example of the system indication module can be shell script of the system indication module in the server 400 under Linux environment.

```
#!/bin/bash
flag='cat /control/1.txt' # #The server 400 reads a flag
echo "$flag"
cd /tftpboot/pxelinux.cfg/ # #Enter tftpboot/pxelinux.cfg
   directory
sed -i'1,1c default '$flag'' default # #Modify a file in default
unix2dos default # #Switch to Dos format
service xinetd reload # #Reload tftp server
exit 0
```

Shell script of the system indication module in the DUT 410:

```
mount -o nolock 192.168.100.1:/control /control #The
   DUT 410 loads a control file of the server 400
rm -rf /control/1.txt #The DUT 410 clears a flag of the
   preceding operating system
echo lurh5u3x64xen_ks > /control/1.txt #The DUT 410
   assigns the next operating system under test
   lurh5u3x64xen_ks
```

In Steps 526-530, the embodiment utilizes the corresponding setup guiding module to clear the partition sector according to the operating system under test needed to be set up. As a result, the DUT 410 determines that the hard disk has not been format (namely emptied boot record status) after rebooting, thereby switches to network booting, and finally loads PXE network setup function.

For simplicity, if an order of the operating systems under test is OS(1)-OS(8), the DUT 410 selects the first operating system under test OS(1) indicated in the setup procedure module AsF(1) for initiating automatic setup of the operating system under test OS(1). After that, all of the operating systems under test can be set up and test automatically. After the operating system under test OS(1) is completely set up via the setup procedure module AsF(1), the server 400 and the test database 420 automatically set up the setup guiding module CMF(1) and the test module TES(1) into the DUT 410. Then the DUT 410 generates and reads the system indication module SYSIM(1) after all of the test operations are completed, and thereby loads the server 400 and calls the corresponding flag indicating the next operating system OS(2) in the system indication module SYSIM(1). As a result, the server 400 generates the setup procedure module AsF(2) according to the corresponding flag. In addition, after the system indication module SYSIM(1) is executed, the DUT 410 uses the setup guiding module CMF(1) to clear the partition sector of the DUT 410, and repeatedly calls the setup procedure modules AsF(2)-AsF(8), the setup guiding modules CMF(2)-CMF(8), the system indication modules SYSIM(2)-SYSIM(8), and the hardware test modules TES(2)-TES(8) for completing all the test automatically after rebooting.

Figure 4:
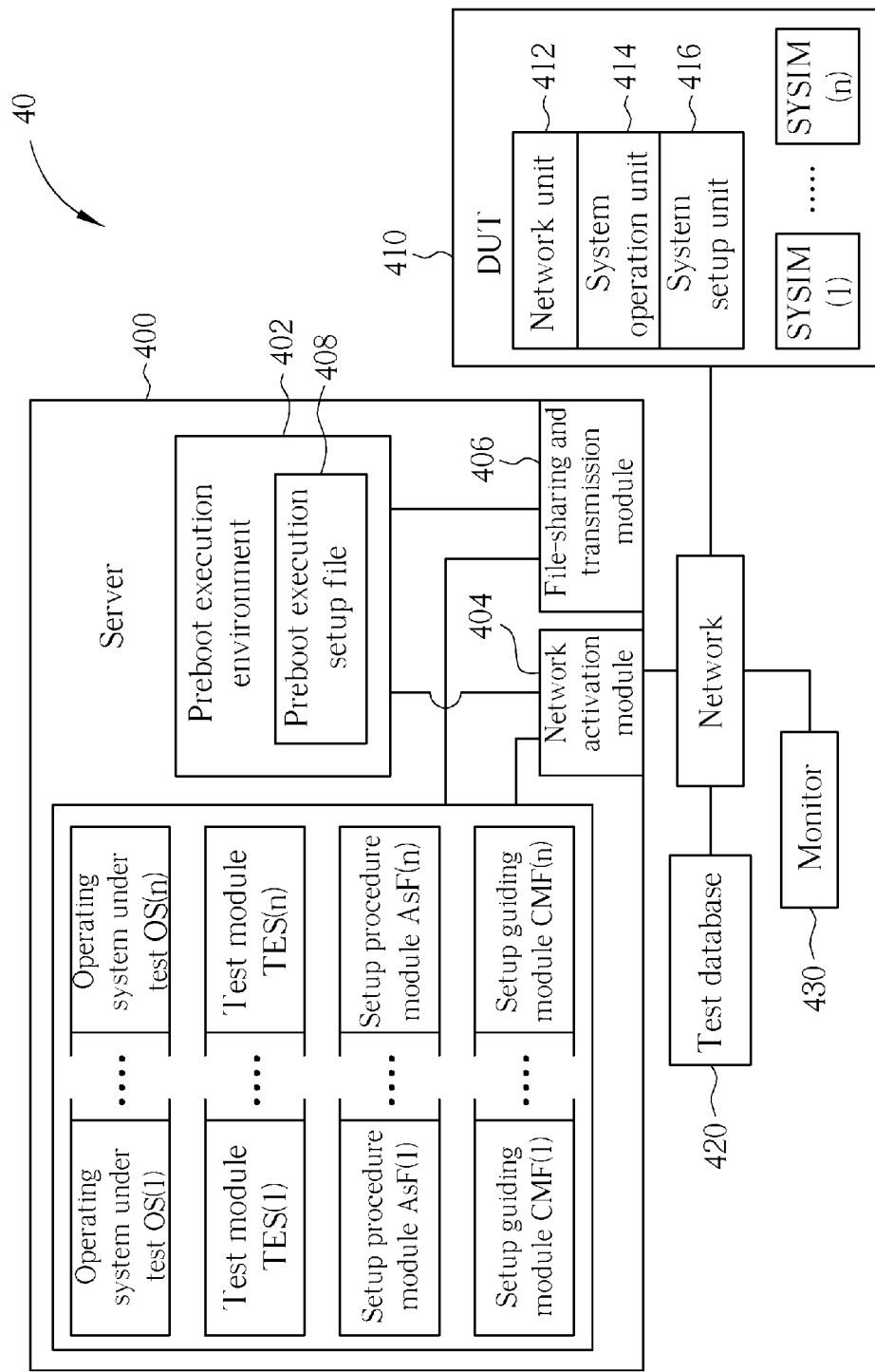
FIG. 4 is a schematic diagram of a test system according to an embodiment of the present invention.

Therefore, through the test process 50, after the first operating system OS(1) is set up, the DUT 410 automatically sets up all of the operating systems OS(2)-OS(n), and performs the related test procedure. As a result, the operator can return to the test system 40 for studying the test results of the DUT 410 until all of the test procedures are completed. Please note that, the DUT 410 in FIG. 4 is simply utilized for illustrating the test process 50, but in reality the server 400 can perform the operating system setup with multiple DUTs at a time. In addition, related parameters and modules (such as setup procedure module and setup guiding module) can be transmitted through point-to-point method or broadcast method for separately or jointly controlling a test schedule of the DUTs.

Preferably, the setup procedure module can be combined with other modules, such as the setup guiding module or the system indication module, for saving network resource of the test system and system resource of an executor (such as the electronic device 20 or the DUT 410).

In conclusion, the embodiments provide the device capable of automatically setting up multiple operating systems and the method thereof, which can be applied in the test system, so that the DUT of the test system can automatically, consecutively sets up the operating systems and tests the operating systems. Therefore, the operator only needs to preset the test environment file and operating systems needed by the DUT into the server, thereby avoiding manually setting up each of the operating system under test. In other words, although the operator is off duty, the test system can perform test operation by itself. As a result, the test system can reduce human resource cost, so as to increase test efficiency.

Those skilled in the art will readily observe that numerous modifications and alterations of the device and method may be made while retaining the teachings of the invention.

What is claimed is:

1. An electronic device capable of automatically, consecutively setting up multiple operating systems, the electronic device comprising:
    a system operation unit operated in an operating system;
    a receiving unit for receiving a target operating system;
    a setup procedure module for providing a setup procedure associated with the target operating system;
    a setup guiding module for clearing a partition sector of the electronic device during operation of the operating system to generate an emptied boot record status, wherein the partition sector of the electronic device is a master boot record (MBR); and
    a system setup unit for automatically setting up the target operating system by the electronic device according to the emptied boot record status and the setup procedure when the electronic device reboots in a non-hard disk booting according to the emptied boot record status;
    wherein the system operation unit is operated in the target operating system after the system setup unit sets up the target operating system.

2. The electronic device of claim 1, wherein the receiving unit is a network unit coupled to a server, and is further used for receiving the setup procedure module, the setup guiding module and a hardware test module used for testing the electronic device.

3. The electronic device of claim 2, wherein the system operation unit further generates a system indication module for indicating the target operating system to the server.

4. The electronic device of claim 1, wherein the receiving unit is a data transmission interface and is further used for receiving the setup procedure module, the setup guiding module and a hardware test module used for testing the electronic device.

5. A method of automatically, consecutively setting up multiple operating systems, for an electronic device operated in an operating system, the method comprising:
    clearing a partition sector of the electronic device during operation of the operating system to generate an emptied boot record status, wherein the partition sector of the electronic device is a master boot record (MBR);
    automatically setting up a target operating system by the electronic device according to the emptied boot record status and a setup procedure associated with the target operating system when the electronic device reboots in a non-hard disk booting according to the emptied boot record status; and
    switching to be operated in the target operating system after the target operating system is set up.

6. The method of claim 5, further comprising:
    utilizing a network to couple to a server; and
    receiving the target operating system, a setup procedure module used for providing the setup procedure, and a setup guiding module from the server.

7. The method of claim 6, wherein clearing the partition sector of the electronic device during operation of the operating system to generate the emptied boot record status comprises:
    clearing the partition sector of the electronic device according to the setup guiding module during operation of the operating system, to generate the emptied boot record status.

8. The method of claim 7, further comprising:
    generating a system indication module for indicating the target operating system to the server.

9. The method of claim 5, further comprising:
    utilizing a data transmission interface for receiving the target operating system, a setup procedure module used for providing the setup procedure, and a setup guiding module.

10. The method of claim 9, wherein clearing the partition sector of the electronic device during operation of the operating system to generate the emptied boot record status comprises: clearing the partition sector of the electronic device according to the setup guiding module during operation of the operating system, to generate the emptied boot record status.

11. A method of automatically, consecutively setting up multiple operating systems, for a test system, the method comprising:
    providing a server including a plurality of operating systems under test and a remote install environment;
    providing a device under test (DUT), coupled to the server and operated in a third operating system of the plurality of operating systems under test, wherein the DUT is compatible with the remote install environment and includes a third setup guiding module associated with the third operating system and a fourth setup procedure module associated with a fourth operating system of the plurality of operating systems under test;
    utilizing the third setup guiding module to clear a partition sector of the DUT, to generate an emptied boot record status, wherein the partition sector of the DUT is a master boot record (MBR);
    rebooting the DUT operated in the third operating system;
    after the DUT is rebooted, entering a network boot procedure according to the emptied boot record status for loading the remote install environment;
    automatically setting up the fourth operating system from the server into the DUT by the DUT according to the fourth setup procedure module under the remote install environment; and
    performing a fourth test procedure associated with the fourth operating system after the fourth operating system is completely set up into the DUT.

12. The method of claim 11, further comprising performing a third test procedure associated with the third operating system during the DUT operation in the third operating system.

13. The method of claim 11, wherein the third operating system is the first operating system set up in the DUT among the plurality of operating systems under test.

14. The method of claim 13, further comprising:
loading the remote install environment on the DUT; and
setting up the third operating system from the server into the DUT according to a third setup procedure module associated with the third operating system under the remote install environment.

15. The method of claim 14, wherein setting up the third operating system from the server into the DUT according to the third setup procedure under the remote install environment comprises:
the server configuring a network address to the DUT;
establishing a network file-sharing and transmitting link between the server and the DUT; and
utilizing the network file-sharing and transmitting link to transmit the third operating system to the DUT for setup.

16. The method of claim 11, wherein the third operating system is the second operating system set up in the DUT among the plurality of operating systems under test.

17. The method of claim 16, further comprising:
when the DUT is operated in a fifth operating system, clearing a partition sector of the DUT according to a fifth setup guiding module associated with the fifth operating system, to generate an emptied boot record status, wherein the fifth operating system is a preceding operating system of the third operating system set up in the DUT;
rebooting the DUT operated in the fifth operating system;
entering a network boot procedure according to the emptied boot record status for loading the remote install environment after the DUT is rebooted; and
setting up the third operating system from the server into the DUT according to the third setup procedure module associated with the third operating system under the remote setup environment.

18. The method of claim 11, wherein setting up the fourth operating system from the server into the DUT according to the setup procedure module under the remote install environment comprises:
the server configuring a network address to the DUT;
establishing a network file-sharing and transmitting link between the server and the DUT; and
utilizing the network file-sharing and transmitting link to transmit the fourth operating system to the DUT for setup.

19. The method of claim 11, wherein the third setup guiding module and the fourth setup procedure module are transmitted to the DUT after being generated by the server.

20. The method of claim 19, further comprising the DUT operated in the third operating system generating a system indication module to indicate the server that the next target operating system is the fourth operating system.

21. The method of claim 11, further comprising providing a test database coupled to the server and the DUT, for providing test parameters of the four test procedure.

* * * * *